(12) United States Patent
Omari et al.

(10) Patent No.: US 11,214,270 B2
(45) Date of Patent: Jan. 4, 2022

(54) SYSTEMS AND METHODS FOR NAVIGATING VEHICLES WITH REDUNDANT NAVIGATION SYSTEMS

(71) Applicant: Woven Planet North America, Inc., Los Altos, CA (US)

(72) Inventors: Sammy Omari, Menlo Park, CA (US); Christian Alexander Stephan Buckl, Los Altos, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 221 days.

(21) Appl. No.: 16/457,683

(22) Filed: Jun. 28, 2019

(65) Prior Publication Data
US 2020/0406907 A1    Dec. 31, 2020

(51) Int. Cl.
| B60W 50/02 | (2012.01) |
| B60W 50/023 | (2012.01) |
| G07C 5/00 | (2006.01) |
| G05D 1/00 | (2006.01) |

(52) U.S. Cl.
CPC ......... *B60W 50/023* (2013.01); *G05D 1/0077* (2013.01); *G07C 5/008* (2013.01); *G05D 2201/0213* (2013.01)

(58) Field of Classification Search
CPC .................................................. B60W 50/023
See application file for complete search history.

(56) References Cited

U.S. PATENT DOCUMENTS

| 9,507,346 | B1 * | 11/2016 | Levinson | G05D 1/0291 |
| 9,612,123 | B1 * | 4/2017 | Levinson | B60W 30/09 |
| 9,645,577 | B1 * | 5/2017 | Frazzoli | B60W 30/18163 |
| 10,908,608 | B2 * | 2/2021 | Zhang | B60W 60/001 |
| 2015/0342110 | A1 * | 12/2015 | Peake | A01B 69/004 701/50 |
| 2015/0346728 | A1 * | 12/2015 | Peake | G05D 1/0219 701/23 |
| 2017/0124476 | A1 * | 5/2017 | Levinson | G01S 17/931 |
| 2017/0162050 | A1 * | 6/2017 | Chen | B60W 30/095 |
| 2017/0364427 | A1 * | 12/2017 | Blea | G06F 11/3055 |
| 2018/0217601 | A1 * | 8/2018 | Marcoux | G08G 1/166 |
| 2018/0284775 | A1 * | 10/2018 | Brettschneider | B60W 30/18145 |

(Continued)

*Primary Examiner* — Alex C Dunn
(74) *Attorney, Agent, or Firm* — Christopher G. Darrow; Darrow Mustafa PC

(57) ABSTRACT

Systems, methods, and non-transitory computer-readable media can receive sensor data providing information about an environment surrounding a vehicle to a first computing system and a second computing system associated with the vehicle, wherein the first computing system and the second computing system are each capable of generating navigation instructions for the vehicle based on the received sensor data. A first planned trajectory is determined based on the sensor data by the first computing system. The vehicle is navigated by the first computing system based on the first planned trajectory. Control of the vehicle is transitioned from the first computing system to the second computing system based on a failure associated with the first computing system. An emulated trajectory is determined based on data describing a current motion of the vehicle by the second computing system. The vehicle is navigated by the second computing system based on the emulated trajectory.

20 Claims, 9 Drawing Sheets

(56) References Cited

U.S. PATENT DOCUMENTS

| | | | |
|---|---|---|---|
| 2019/0163181 A1* | 5/2019 | Liu | G05D 1/0212 |
| 2019/0384303 A1* | 12/2019 | Muller | G06K 9/00791 |
| 2020/0191586 A1* | 6/2020 | Luo | G01C 21/3484 |
| 2020/0193808 A1* | 6/2020 | Guan | G08G 1/0125 |
| 2020/0201324 A1* | 6/2020 | Darayan | G05D 1/0214 |

* cited by examiner

SYSTEMS AND METHODS FOR NAVIGATING VEHICLES WITH REDUNDANT NAVIGATION SYSTEMS

FIELD OF THE INVENTION

The disclosed technology relates to navigation systems. More particularly, the disclosed technology relates to systems, apparatus, and methods for managing operation of vehicles with redundant vehicle navigation systems.

BACKGROUND

Vehicles are increasingly being equipped with intelligent features that allow them to monitor their surroundings and make informed decisions on how to navigate. Such vehicles, whether autonomously or semi-autonomously driven, may be capable of sensing their environment and navigating with little or no human input as appropriate. A vehicle may include a variety of systems and subsystems for enabling the vehicle to determine its surroundings so that it may safely navigate to target destinations. As one example, the vehicle may have a computing system (e.g., one or more central processing units, graphical processing units, memory, storage, etc.) for controlling various operations of the vehicle, such as driving and navigating. To that end, the computing system may process data from one or more sensors and, based on the data, provide navigation instructions (e.g., turn left, turn right, slow down, etc.) for the vehicle.

SUMMARY

Various embodiments of the disclosed technology can include systems, methods, and non-transitory computer readable media configured to receive sensor data from a plurality of sensors configured to provide information about an environment surrounding a vehicle to at least a first computing system and a second computing system associated with the vehicle, wherein the first computing system and the second computing system are each capable of generating navigation instructions for the vehicle based at least in part on the received sensor data. A first planned trajectory is determined based on the sensor data by the first computing system. The vehicle is navigated by the first computing system based on the first planned trajectory. Control of the vehicle is transitioned from the first computing system to the second computing system based on a failure associated with the first computing system. An emulated trajectory is determined based on data describing a current motion of the vehicle by the second computing system. The vehicle is navigated by the second computing system based on the emulated trajectory.

In an embodiment, a second planned trajectory is determined based on the sensor data by the second computing system.

In an embodiment, the emulated trajectory is generated faster than a time required for the second computing system to generate a new planned trajectory from the sensor data.

In an embodiment, the emulated trajectory is an extrapolation of vehicle motion as indicated by current state of at least one vehicle motion control component.

In an embodiment, the failure is determined by at least one health monitor associated with the first computing system.

In an embodiment, the failure is detected by the health monitor, and in response, control of the vehicle is transitioned to the second computing system based on the failure.

The first computing system is a primary computing system and the second computing system is a backup computing system.

In an embodiment, the first computing system does not provide the second computing system with the first planned trajectory.

In an embodiment, the at least one vehicle motion control component is configured to control at least one of a brake, an accelerator, an engine, or a steering wheel, and wherein the emulated trajectory is determined based on information provided by the at least one vehicle motion control component.

In an embodiment, the extrapolation is a linear extrapolation determined based on parameters associated with the vehicle motion control components including at least one of angle, power, speed, torque, or derivatives of the parameters.

In an embodiment, the linear extrapolation reflects an instantaneous velocity of the vehicle the time of the transition of control.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

Figure 1A:
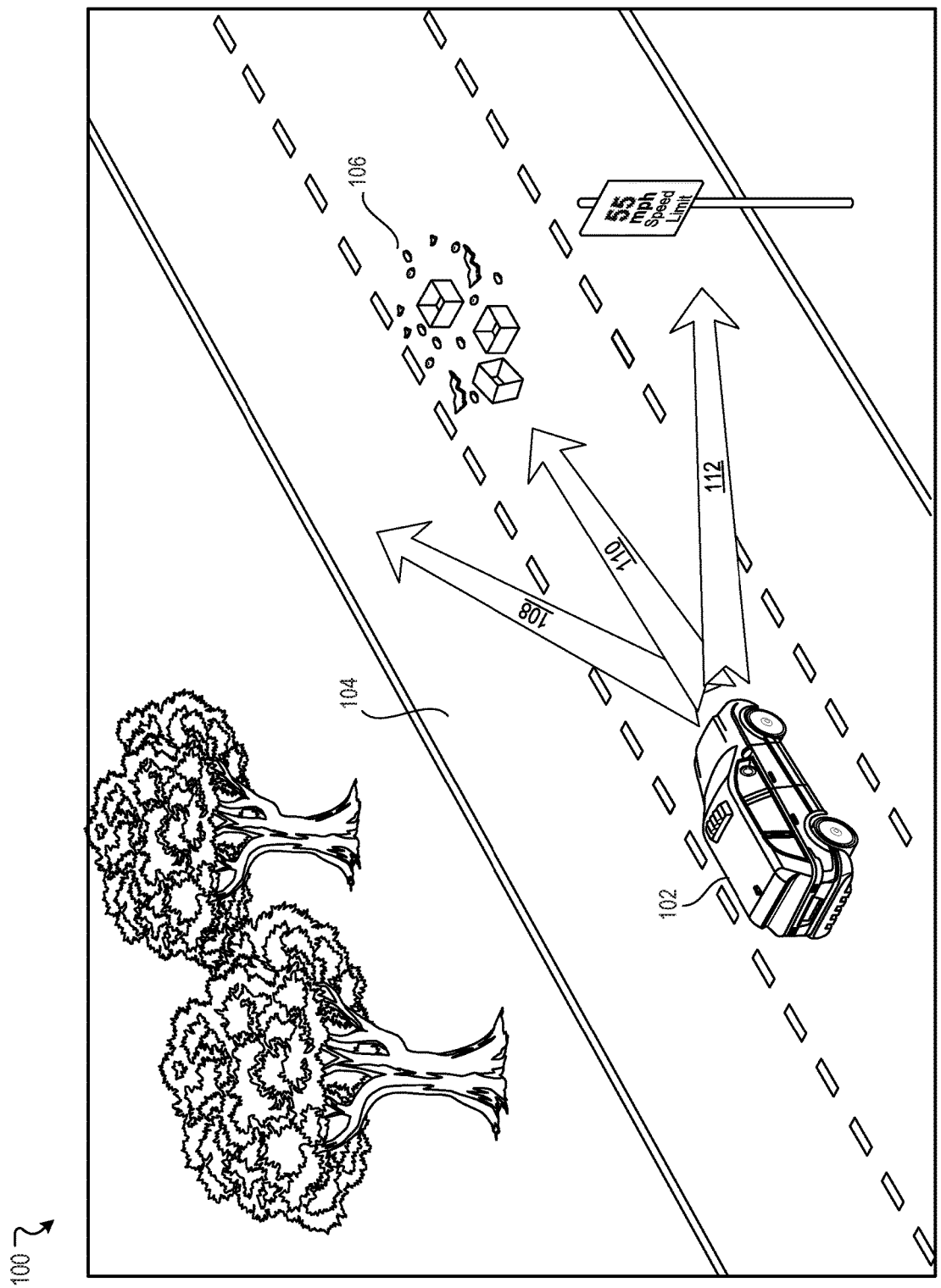
FIGS. 1A-1B illustrate example scenarios demonstrating various challenges that may be experienced with conventional approaches.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to navigate. Such vehicles, whether autonomously or semi-autonomously driven, may be capable of sensing their environment and navigating with little or no human input. A vehicle may include a variety of systems and subsystems for enabling the vehicle to determine its surroundings so that it may safely navigate to target destinations. As one example, the vehicle may have a computing system (e.g., one or more central processing units, graphical processing units, memory, storage, etc.) for controlling various operations of the vehicle, such as driving and navigating. To that end, the computing system may process data from one or more sensors and, based on the data, provide navigation instructions (e.g., turn, slow down, etc.) for the vehicle. However, the computing system or its subsystems may experience a hardware or software failure that prevents the computing system from safely navigating the vehicle. One approach to address this problem is to build redundancy into navigation systems. For example, a vehicle can include a primary navigation system and a backup navigation system that can each operate independently to enable the vehicle to determine its surroundings so that it may safely navigate to target destinations. In this example, the backup navigation system can assume control of the vehicle when the primary navigation system experiences a hardware or software failure. However, building redundant navigation systems into a vehicle raises new challenges that involve coordinating and transitioning operation of the vehicle among the redundant navigation systems. For example, one conventional approach for managing redundant navigation systems in a vehicle is to ensure that the navigation systems are identical with respect to hardware configuration and are bit-identical. Ideally, each navigation system would process sensor data obtained by the vehicle and provide identical navigation trajectories for the vehicle at all times. In other words, the navigation systems would independently receive the same sensor data, process the sensor data in the same manner, and arrive at the same trajectory for navigating the vehicle at all times. In this conventional approach, if one navigation system in the vehicle fails, control of the vehicle can transition to the other navigation system which proceeds to navigate the vehicle along the same trajectory as if no failure had occurred. Thus, the identically navigation systems can satisfy a continuity constraint requirement while allowing seamless transitioning between the navigation systems. However, such identical redundancy comes with substantial challenges involving system engineering and operation that render this conventional approach impractical or uneconomical. For example, a bit-identical setup demands a highly constrained execution environment. Such highly constrained execution environment comes with various disadvantages. For one, the highly constrained execution environment has little to no error tolerance as it is particularly challenging to use diverse sensors and diverse algorithms that can effectively address common cause failures. For another, the highly constrained execution environment must be very restrictive to guarantee bit-identical execution, thus significantly burdening overall performance of the navigation systems. As a result, conventional approaches typically implement non-identical vehicle navigation systems and therefore accept that different vehicle navigation systems associated with a vehicle may plan and implement different trajectories for navigating the vehicle. However, such conventional approaches face additional challenges, as illustrated in the examples of FIGS. 1A-1B.

Figure 1B:
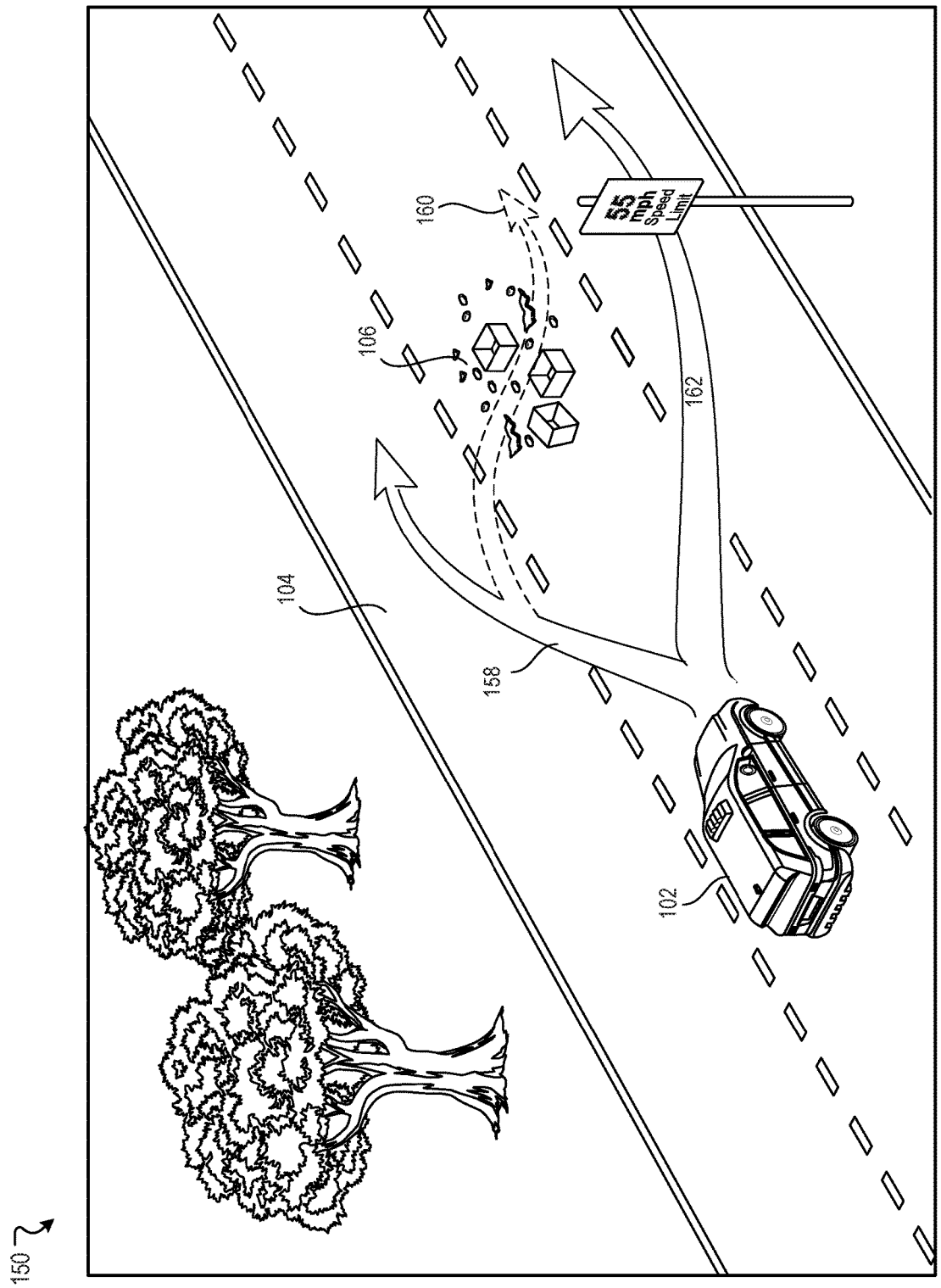

FIG. 1A illustrates an example scenario 100 that is illustrative of various challenges that may be experienced by a vehicle 102. The vehicle 102 can be, for example, a vehicle 640 of FIG. 6. In general, the vehicle 102 may be equipped with one or more sensors that can be used to capture environmental information, such as information describing a given road and objects present on or along the road. For example, in some instances, the vehicle 102 may be equipped with one or more sensors in a sensor suite including optical cameras, LiDAR, radar, infrared cameras, and ultrasound equipment, to name some examples. Such sensors can be used to collect information that can be used by the vehicle 102 to understand its environment and objects within the environment. In FIG. 1A, the vehicle 102 is driving down a road 104 at nearly 55 miles per hour. The vehicle 102 detects debris 106 in its direction of travel. A primary on-board navigation system in the vehicle 102 must quickly determine whether to steer the vehicle 102 to the left 108 of the debris 106, continue forward 110 through the debris 106, steer the vehicle 102 to the right 112 of the debris 106, stop the vehicle 102, or take other appropriate action. The primary on-board navigation system can determine a best trajectory for the vehicle 102 based on environmental information captured by sensor data. In some instances, the vehicle 102 can include a backup on-board navigation system for added safety in case the primary on-board navigation system fails. However, transitioning control of the vehicle 102 from the primary on-board navigation system to the backup on-board navigation system can pose numerous challenges, as illustrated in the example of FIG. 1B. In FIG. 1B, the vehicle 102 is driving down the road 104. The vehicle 102 is equipped with conventional redundant navigation systems including a primary on-board navigation system and a backup on-board navigation system. In this example, the primary and backup navigation systems are not hardware- and bit-identical and, thus, may independently determine different trajectories for navigating the vehicle 102. For example, while driving down the road 104, sensors of the vehicle 102 can detect the debris 106 that is present on the road 104. To avoid the debris 106, the primary navigation system may determine a first trajectory 158 that steers to the left of the debris 106 to avoid collision with the debris 106 while the backup navigation system may determine a second trajectory 162 that steers to the right of the debris 106 to avoid the collision. While both trajectories 158, 162 may each provide a trajectory that can avoid the debris 106, the vehicle 102 can only physically follow a single trajectory. In a scenario where the primary navigation system is controlling the vehicle 102, the primary navigation system can provide initial instructions for the vehicle 102 to avoid the debris 106 by steering left according to its first trajectory 158. At some point in time, the primary navigation system may experience a failure which results in the backup navigation system assuming control of the vehicle 102. As control of the vehicle 102 transitions from the primary navigation system to the backup navigation system, the backup navigation system can instruct the vehicle 102 to proceed along its planned trajectory 162. However, in this example, the vehicle 102 had already been instructed to navigate corresponding to the first trajectory 158 by the primary navigation system before its failure. The vehicle 102 has started adjusting its low-level motion control components (e.g., actuators controlling a steering wheel, acceleration, etc.) to navigate the vehicle 102 based on the first trajectory 158. As a result, the vehicle 102 is partially following the trajectory 158 when the backup navigation system assumes control of the vehicle 102. In this example, the backup navigation system may attempt to re-align the vehicle 102 to follow the second trajectory 162 that was planned by the backup navigation system. However, the vehicle 102 may not be able to instantaneously modify its operation (e.g., change tire direction, reduce speed, etc.) to follow the second trajectory 162 without creating hazardous conditions in the process, as illustrated by a third trajectory 160 that may result when the backup navigation system attempts to re-align the vehicle 102 to follow the second trajectory 162. To address this problem, one conventional approach involves informing the backup navigation system of the first trajectory 158 that was planned by the primary navigation system. Under this conventional approach, the backup navigation system would attempt to control the vehicle 102 based at least in part on the first trajectory 158 planned by the failed primary navigation system. However, in this conventional approach, the first trajectory 158 could have been erroneous due to the failure of the primary navigation system. Further, even if the first trajectory 158 is not erroneous, it could conflict with the second trajectory 162. For example, as illustrated, the first trajectory 158 may instruct the vehicle to steer left and low-level motion control components (e.g., a steering wheel control component, a brake control component, an accelerator control component, an engine control component, or the like) could already reflect the instructions to steer the vehicle to the left. When the backup navigation system assumes control of the vehicle 102 upon the detection of a failure in the primary navigation system, the second trajectory 162 may not be immediately applied to the low-level motion control components that are reflecting motion instructed by the first trajectory 158. Thus, relying on the first trajectory 158 in any way when the second navigation system assumes control can result in unpredictability and possible hazardous conditions, as discussed further in reference to FIG. 2.

Figure 2:
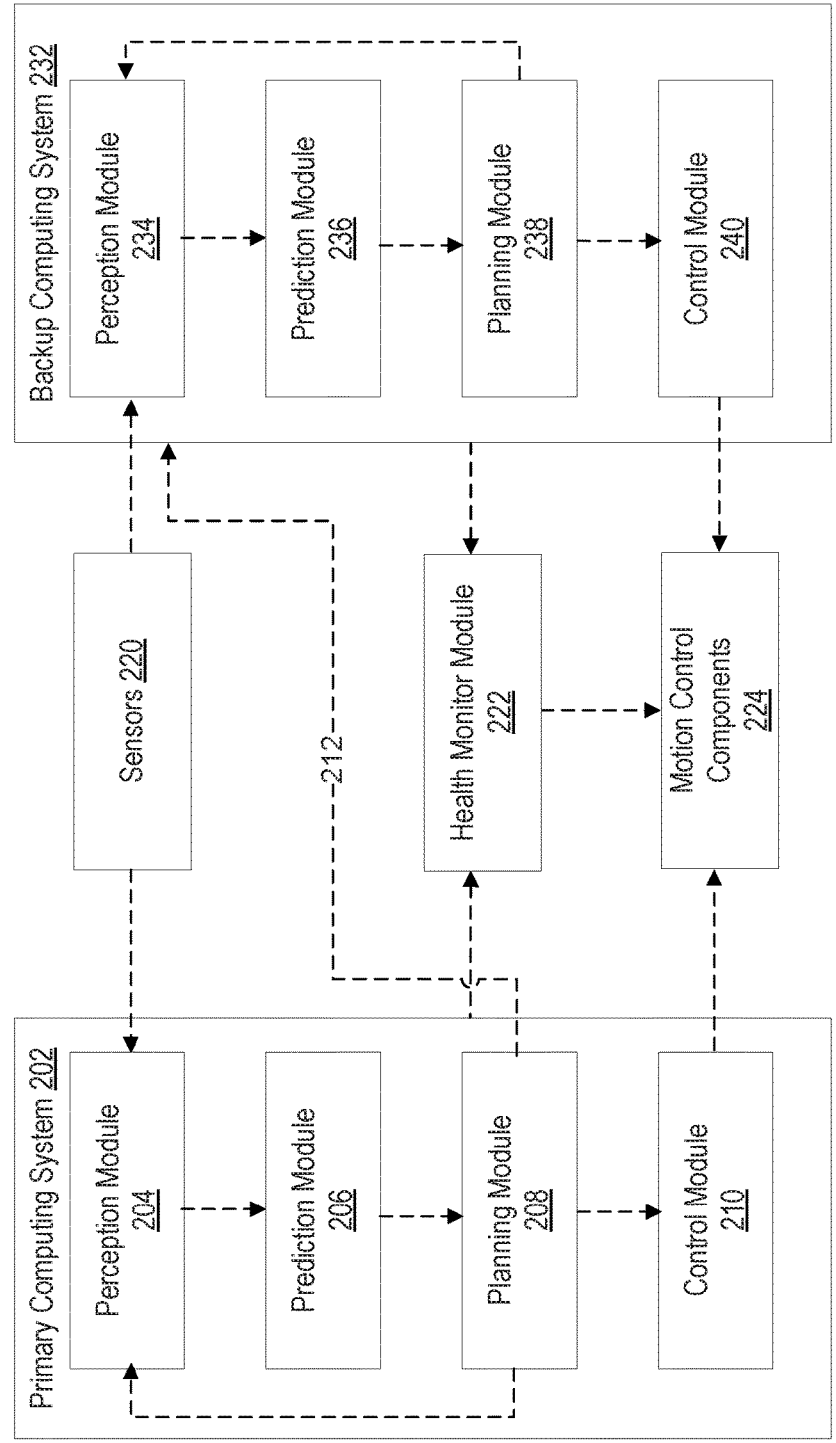
FIG. 2 illustrates an example configuration of conventional redundant navigation systems.

FIG. 2 illustrates an example conventional configuration 200 of a redundant navigation systems, according to conventional technology. As shown in the example of FIG. 2, the example conventional configuration 200 can include a first navigation system including a primary computing system 202, which can be a primary computing system for the operation of the vehicle. The conventional configuration 200 also includes a second navigation system including a backup computing system 232, which can be a backup computing system for operation of the vehicle. The primary computing system 202 and backup computing system 232 can receive sensor data from a plurality of sensors 220 configured to provide information about an environment surrounding a vehicle. Some example sensors can be sensors 644 in FIG. 6. The primary computing system 202 can include a perception module 204, a prediction module 206, a planning module 208, and a control module 210. In the conventional configuration 200, the backup computing system 232, similar to the primary computing system 202, can include its own perception module 234, prediction module 236, planning module 238, and control module 240. Generally, the perception module 204 can be configured to collect information about the environment surrounding the vehicle and extract relevant information. The perception module 204 can develop a contextual understanding of the environment, such as where obstacles are located, detect road signs or markings, or categorize detected objects. Further, the perception module 204 can determine or localize a position of the vehicle with respect to the environment. Once the perception module 204 determines its environment and successfully localizes the vehicle in the environment, it can provide such information to the prediction module 206. The prediction module 206 can be configured to predict locations and trajectories of the detected objects (e.g., vehicles, pedestrians, deer, debris, etc.). The prediction module 206 can provide its predictions to the planning module 208. The planning module 208 can be configured to make high-level decisions, such as which trajectory the vehicle should travel from a starting location to a destination location. The planning module 208 can provide planned trajectories to the perception module 204 in a feedback loop. The feedback loop can improve functions of the perception module 204, prediction module 206, or planning module 208. For example, if the vehicle is turning left based on a planned trajectory, and provides some or all of its trajectory-related information back to the perception module 204, the perception module 204 can better filter and process the sensor data 220 to improve contextual understanding and localization. Similarly, the prediction module 206 can also benefit from the feedback loop as it can better focus on predicting what is likely to happen along the planned trajectory in the future. Continuing with the description of the primary computing system 202, the planning module 208 can provide its planned trajectories to the control module 210. The control module 210 can interpret the planned trajectories for high-level decisions (e.g., steer left 45 degrees while slowing down speed to 15 mph) and can provide a set of specific control instructions to low-level motion control components 224 that navigate the vehicle to correspond to the planned trajectories. For example, the vehicle may be instructed to rotate a steering wheel counter-clockwise for a certain amount at a certain rate while applying brakes gradually. The perception module 234, the prediction module 236, the planning module 238, and the control module 240 of the backup computing system 232 function in a manner similar to the perception module 204, the prediction module 206, the planning module 208, and the control module 210 of the primary computing system 202.

Each of the control modules 210, 240 of the primary computing system 202 and the backup computing system 232 can individually determine instructions for controlling vehicle motion control components 224. The example conventional configuration 200 can include a health monitor module 222 that collects information including system health information from the primary computing system 202 and backup computing system 232. For example, the health monitor module 222 can permit the control module 210 of the primary computing system 202 to control motion control components 224 if satisfied with system health information provided by the primary computing system 202. However, if system health information provided by the primary computing system 202 indicates a system failure, then the health monitor module 222 can permit the control module 240 of the backup computing system 232 to assume control of the vehicle. FIG. 2 also illustrates use of a conventional signal to communicate trajectory information between the primary computing system 202 and the backup computing system 232. For example, the planning module 208 of the primary computing system 202 can provide its planned trajectory as a signal 212 to one or more modules of the backup computing system 232. Under this conventional approach, the backup computing system 232 can receive and use the planned trajectory of the primary computing system 202 to determine its own trajectory at the planning module 238. However, the trajectory planned by the primary computing system 202 can conflict with a trajectory planned by the backup computing system 232, thereby creating hazardous conditions, as described above in reference to FIG. 1B.

An improved approach in accordance with the disclosed technology overcomes the foregoing and other disadvantages associated with conventional approaches. In various embodiments, a backup navigation system that assumes control of a vehicle can generate and use an emulated trajectory to navigate the vehicle without relying on trajectories that were planned by a failed primary navigation system. In some embodiments, the emulated trajectory can be generated based on information describing actual vehicle motion or control signals provided to motion control components. In some embodiments, the emulated trajectory can be an extrapolation of vehicle motion or assumed current trajectory. For example, the extrapolation, in some instances, can be a linear extrapolation of the vehicle motion. In some embodiments, the linear extrapolation of the vehicle motion reflects an instantaneous velocity of the vehicle at or near the time of the transition of control. The generation and adoption of an emulated trajectory provides at least two advantages. First, the emulated trajectory is generated based on current states as detected from vehicle motion control components and can be generated at a higher frequency than conventional approaches for trajectory planning. The emulated trajectory can thus be generated in real-time (or near real-time) to help ensure that a continuity constraint requirement for the vehicle remains satisfied despite an unforeseen primary computing system failure so that the navigation of the vehicle is more comfortable for passengers while the navigation still allows for appropriate path planning around obstacles. Second, the conventional approach of providing a trajectory planned by a failed primary navigation system to a backup navigation system introduces an additional input variable to the navigation control process. The additional input variable can complicate engineering, implementation, and testing efforts related to the redundant systems. The disclosed technology improves upon the conventional approaches by greatly simplifying development and maintenance of redundant navigation systems while helping ensure seamless and safe transitioning between redundant navigation systems.

Figure 3A:
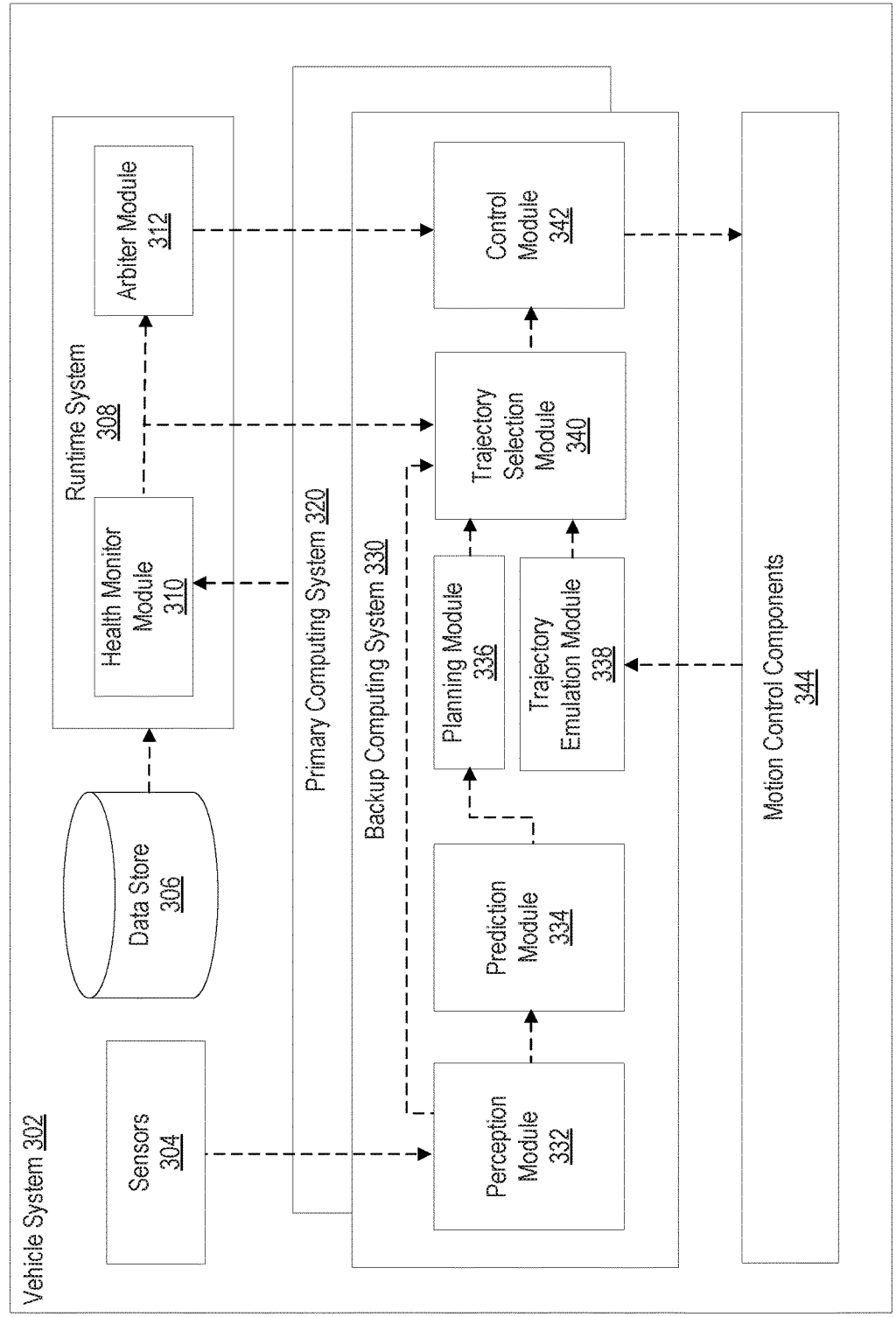
FIG. 3A illustrates an example functional block diagram of a vehicle system, according to an embodiment of the disclosed technology.

FIG. 3A illustrates an example 300 of a vehicle system 302, according to an embodiment of the disclosed technology. As shown in the example of FIG. 3A, the vehicle system 302 can include sensors 304, a runtime system 308, a primary computing system (e.g., a first computing system) 320, a backup computing system (e.g., a second computing system) 330, and motion control components 344 for controlling a vehicle in which the vehicle system 302 is implemented. The example vehicle system 302 can include at least one data store 306. In some embodiments, some or all of the functionality performed by the vehicle system 302 and its sub-modules may be performed by one or more computing systems implemented in a vehicle, such as a vehicle system 640 of FIG. 6. The components (e.g., modules, elements, etc.) shown in this figure and all figures herein are exemplary only, and other implementations may include additional, fewer, integrated, or different components. For example, although only the primary computing system 320 and backup computing system 330 are shown in FIG. 3A, three or more computing systems may be included in the vehicle system 302. Some components may not be shown so as not to obscure relevant details.

The runtime system 308 can include a health monitor module 310 and an arbiter module 312. The runtime system 308 can be configured to communicate and operate with the at least one data store 306, as shown in the example system 300. The at least one data store 306 can be configured to store and maintain various types of data. For example, the data store 306 can store hardware profiles, including timing and response profiles, of motion control components 344, diagnostic codes for the motion control components 344, handling routines for types of failures that may be experienced by a computing system (e.g., primary computing system 320 or backup computing system 330), event logs, and the like. In some embodiments, some or all data stored in the data store 306 can be stored by the vehicle 640 of FIG. 6. The runtime system 308 can access data stored in the data store 306 to configure the health monitor module 310 to detect primary computing system failures and determine vehicle control instructions in case of such failure.

The health monitor module 310 can be configured to receive or access diagnostics (e.g., system health diagnostics) from the primary computing system 320 and the backup computing system 330. The diagnostic information associated with the primary computing system 320 or the backup computing system 330 can indicate a healthy state, a failed state, a warning, or the like. In some embodiments, the health monitor module 310 may store the diagnostics in an event log stored in the data store 306. In some embodiments, each of the primary computing system 320 and the backup computing system 330 may include a health monitor module which can provide collected diagnostic information to the health monitor module 310.

In some embodiments, the arbiter module 312 can be configured to receive diagnostics from the health monitor module 310 and, upon a detection of a failure of the primary computing system 320, can transition control of the vehicle to the backup computing system 330. The arbiter module 312 can provide a selection mechanism (e.g., a multiplexer) for a control module 342 of the backup computing system 330 and its counterpart control module of the primary computing system 320 so that only one set of control signals from a control module can be provided to the motion control components 344. The selection mechanism can determine which set of control signals to provide to the motion control components 344 based on the diagnostics as detected and processed by the health monitor module 310. For example, if the primary computing system 320 is in a failed state, then the selection mechanism provided by the arbiter module 312 can provide control signals generated by the control module 342 of the backup computing system 330.

As shown, the backup computing system 330 can include a perception module 332, a prediction module 334, a planning module 336, a trajectory emulation module 338, a trajectory selection module 340, and the control module 342. Likewise, the primary computing system 320 can include its own perception module, prediction module, planning module, trajectory emulation module, trajectory selection module, and control module. These perception, prediction, planning, and control modules can perform the same or similar operations as corresponding modules discussed in reference to FIG. 2. Further, a trajectory emulation module 338 and a trajectory selection module 340 of the backup computing system 330 can be configured to perform the same operations, as described below.

The trajectory emulation module 338 can generate, or otherwise determine, an emulated trajectory based on current states of motion control components 344. In some embodiments, the emulated trajectory can be continuously generated. In some embodiments, the emulated trajectory can be generated at or shortly after detection of a failure at the primary computing system 320. The motion control components 344 can be components that individually or collectively control motion of the vehicle. For example, the motion control components 344 can include a steering wheel control component, a brake control component, an accelerator control component, an engine control component, or the like. The motion control components 344 can interpret control signals provided by the control module 342 and effectuate change in vehicle motion. In some embodiments, the trajectory emulation module 338 can access current states of the motion control components 344 to generate emulated trajectories. For example, the trajectory emulation module 338 can determine an emulated trajectory from an angular orientation of a steering wheel, vehicle acceleration, vehicle braking, or revolution of an engine to determine vehicle motion including velocity (e.g., direction and speed) or acceleration of the vehicle at the instance. In some embodiments, the trajectory emulation module 338 can snoop control signals for controlling the motion control components 344 (e.g., snooping on a signal bus) and can determine how the vehicle is instructed to navigate. Each of the motion control components 344 can be associated with various parameters that describe the current states of the motion control components 344. For example, angle, power, torque, and the like can be some of the various parameters. Some parameters can be derivatives of other parameters, such as angular velocity or angular acceleration. The parameters can provide information on current or near-future vehicle motion. In some embodiments, the trajectory module 338 can generate the emulated trajectory by extrapolating vehicle motion. In some embodiments, the extrapolation may be a linear extrapolation. Generally, an amount of time needed to determine the emulated trajectory is substantially shorter (e.g., generated faster) than an amount of time required for the backup computing system 330 to generate a new planned trajectory from the sensor data. Thus, the backup computing system 330 can determine an emulated trajectory faster than a new planned trajectory. For example, the backup computing system 330 may determine a planned trajectory every second and can determine hundreds of emulated trajectories within the same period of time. Such values are examples, and many variations are possible.

The trajectory selection module 340 can be configured to receive a planned trajectory from the planning module 336 and an emulated trajectory from the trajectory emulation module 338. The trajectory selection module 340 can then select a trajectory to provide to the control module 342. For example, the runtime system 308 can instruct the backup computing system 330 to select the planned trajectory or the emulated trajectory based on diagnostics related to the primary computing system 320. For example, the primary computing system 320 can continuously or periodically provide its diagnostics to the health monitor module 310. When the primary computing system 320 is operating in a normal state (e.g., no failures or warnings reported by the primary computing system 320), the backup computing system 330 continues to independently determine planned trajectories with the planning module 336. However, these planned trajectories are not used to control the vehicle since the primary computing system 320 is operating in a normal state. When the health monitor module 310 determines that the primary computing system 320 has experienced a failure, the runtime system 308 can instruct the trajectory selection module 340 to use an emulated trajectory determined by the trajectory emulation module 338 rather than a trajectory that was planned by the planning module 336. Many variations to the illustrated example system in FIG. 3A are possible and there can be additional, fewer, or alternative modules in similar or alternative configurations. Such similar or alternative configurations that ensure the functionalities described herein are all within the scope of various embodiments of the present invention unless otherwise stated.

Figure 3B:
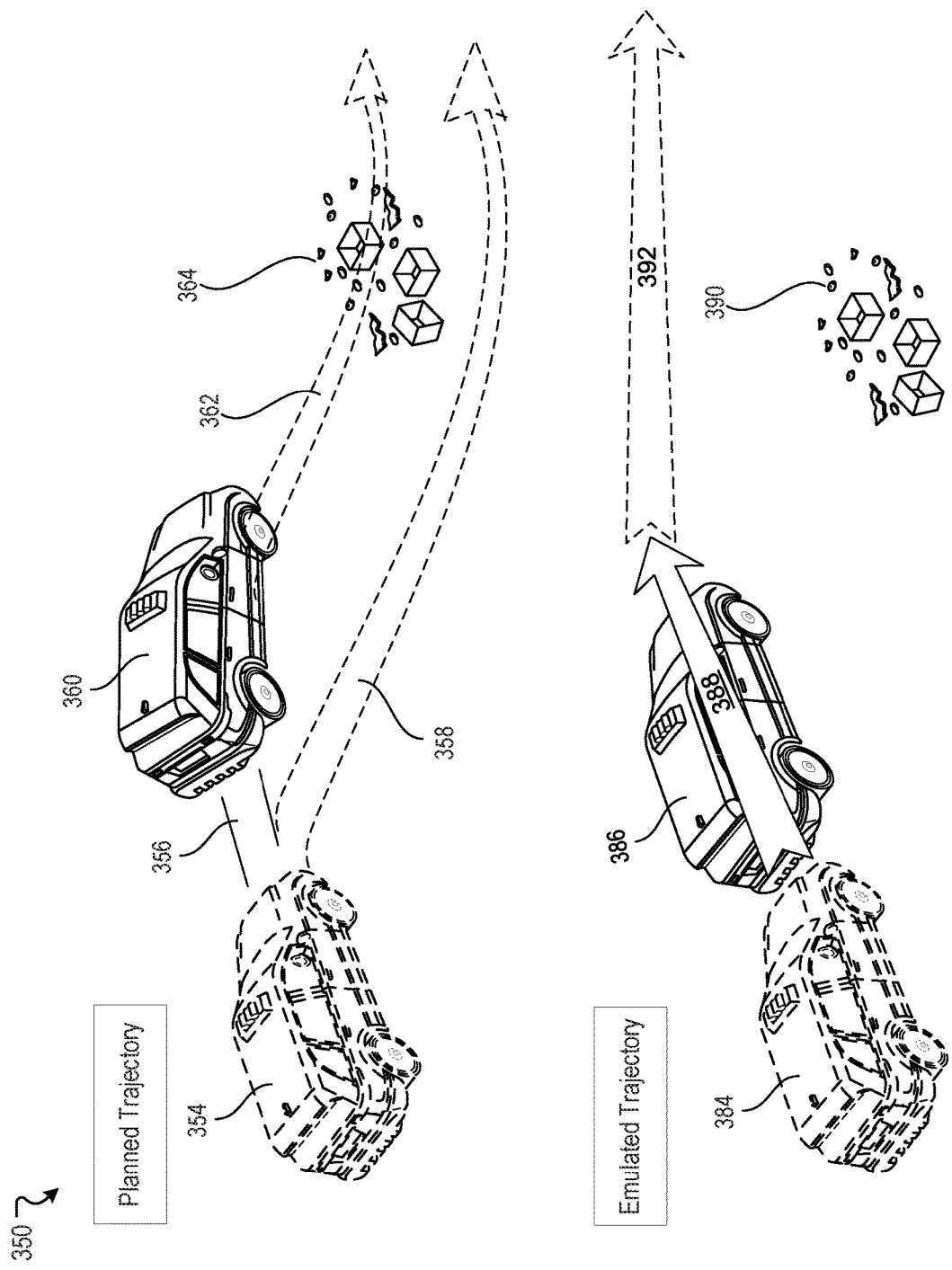
FIG. 3B illustrates example planned and emulated vehicle trajectories, according to an embodiment of the disclosed technology.

FIG. 3B illustrates differences between example travel paths determined by conventional technology and the disclosed technology. For example, the example travel path provided by conventional technology can be determined by the conventional navigation system 200 of FIG. 2. In this example, a vehicle 354, while navigating along a trajectory provided by a primary computing system, experiences a failure in the primary computing system. The vehicle 354 transitions control to a backup computing system. The vehicle 354 is instructed to follow a planned trajectory 358. However, because vehicle motion (e.g., momentum) is in conflict with the planned trajectory 358, the vehicle 354 cannot immediately navigate along the planned trajectory 358. The vehicle 354, therefore, ends up moving some distance 356 before it can be effectively controlled by the backup computing system. As discussed, each planned trajectory can require some amount of time to be generated and, depending on vehicle velocity, the distance 356 can be substantial. In this example, the vehicle 354 advances to a position 360 after travelling the distance 356. The backup computing system can attempt to re-align the vehicle 354 to correspond to the planned trajectory 358. However, during re-alignment, the vehicle 354 may end up following an undesired trajectory 362 which may result in a hazardous condition, such as driving over some debris 364.

In contrast, according to the disclosed technology, a vehicle 384 includes a backup computing system that determines and controls the vehicle 384 based on an emulated trajectory 388. In some embodiments, the emulated trajectory 388 can be an extrapolation of vehicle motion or current assumed trajectory. As discussed in FIG. 3A, the emulated trajectory 388 can be generated at a much higher frequency than a planned trajectory provided by the backup computing system. For at least a short duration, the vehicle 384 can travel along the emulated trajectory 388 to a new position 386. Soon after, the backup computing system can continue operating the vehicle 384 by generating a new planned trajectory 392 consistent with a motion and direction of travel of the vehicle 384, thus avoiding a hazardous condition, such as driving over some debris 390.

Figure 4:
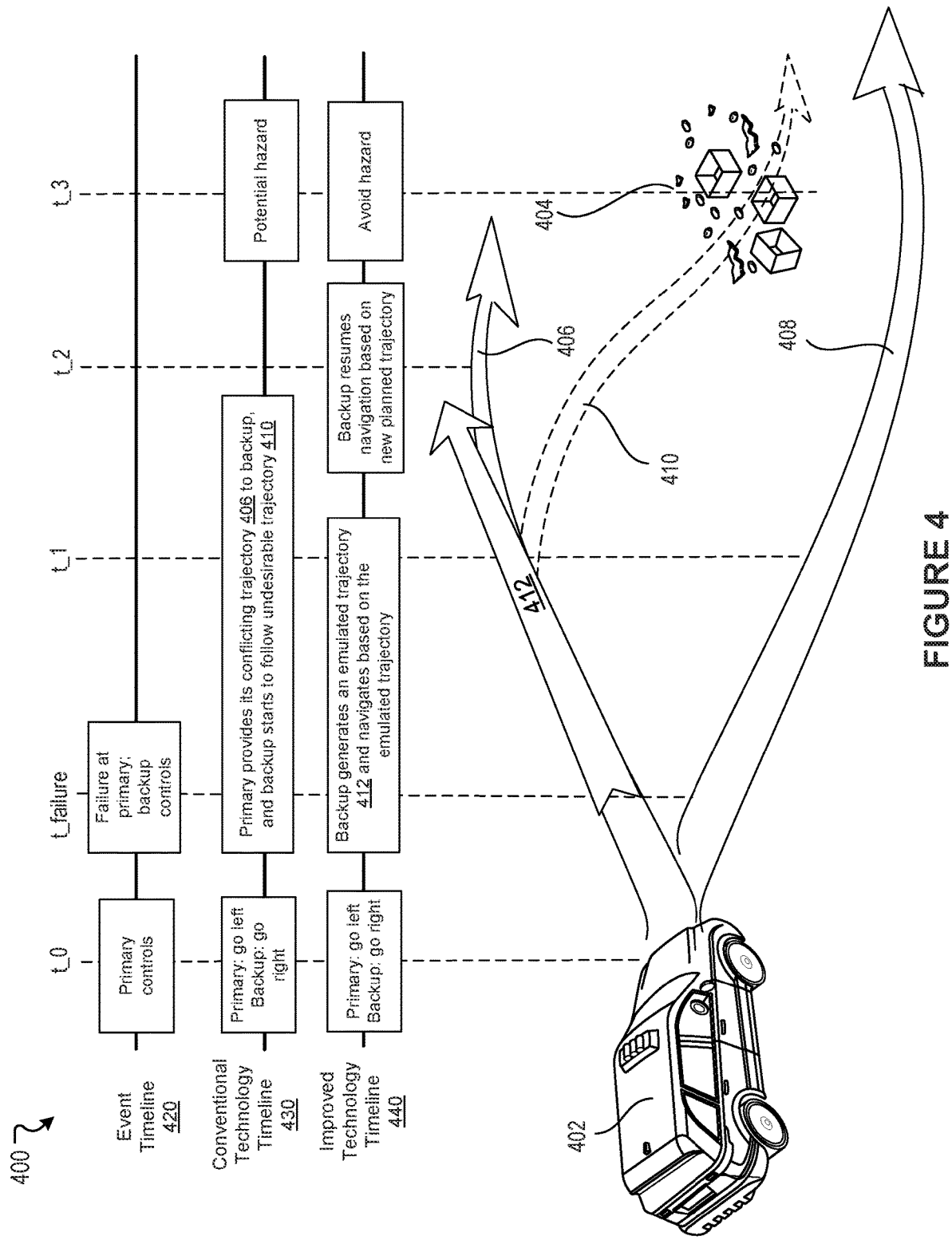
FIG. 4 illustrates example timelines for demonstrating differences between conventional technology and an embodiment of the disclosed technology.

FIG. 4 illustrates example timelines demonstrating improvements of the disclosed technology over conventional technology. The timelines represent a progression of time from left to right. The timelines 420, 430, 440 are provided to better illustrate differences between conventional technologies and the disclosed technology. An event timeline 420 describes events related to a vehicle 402. A conventional technology timeline 430 describes how conventional technology may respond to events occurring in the event timeline 420. An improved technology timeline 440 illustrates how the disclosed technology can respond to events based on improvements described in reference to FIGS. 3A and 3B. The timelines 420, 430, and 440 are provided as examples and such timelines can vary. Additionally, illustrated trajectories 406, 408, 410, 412 are for illustrative purposes only and many variations are possible.

At time t_0, the vehicle 402 is in a healthy state. A primary computing system (in FIG. 4, "primary") associated with the vehicle 402 is controlling the vehicle 402. The vehicle 402 detects, or otherwise determines, debris 404 in its path of vehicle motion. To avoid a potential collision, the primary computing system can generate a planned trajectory 406 for the vehicle 402, and can provide control signals to implement the planned trajectory 406 such that the vehicle 402 follows the planned trajectory 406. A backup computing system (in FIG. 4, "backup") of the vehicle 402 can similarly generate its own planned trajectory 408 that can be different from the trajectory 406 planned by the primary computing system. Although capable of controlling the vehicle 402, at this point in time the backup computing system is decoupled from motion control components and therefore the vehicle 402 moves as instructed by the primary computing system. According to timeline 430 describing conventional technology, at time t_0, the primary computing system instructs the vehicle to steer left and follow a left planned trajectory 406 while the backup computing system plans a right planned trajectory 408. Similarly, according to timeline 440 describing the disclosed technology, at time t_0, the primary computing system instructs the vehicle to steer left and follow the left planned trajectory 406 while the backup computing system plans the right planned trajectory 408.

At or shortly after a time of failure (t_failure), a runtime system in the vehicle 402 receives an indication that the primary computing system has failed. The runtime system can then instruct the primary computing system to relinquish control of the vehicle 402 and can instruct the backup computing system to assume control of the vehicle 402. Before the backup computing system can assume control of the vehicle 402, the vehicle 402 has already proceeded at least partially along the trajectory 406 that was planned by the primary computing system. Based on conventional technology, once the backup computing system assumes control of the vehicle 402, the backup computing system can instruct the vehicle 402 to follow the right planned trajectory 408 that was planned by the backup computing system. However, motion control components of the vehicle 402, which have been following instructions from the primary computing system, may not permit the vehicle 402 to immediately transition to the right planned trajectory 408. Accordingly, the vehicle 402 may end up following an undesirable trajectory 410 due to the backup computing system abruptly transitioning the vehicle 402 from the left planned trajectory 406 to the right planned trajectory 408. As a result, at time t_3, conventional technology may cause the vehicle 402 to follow the trajectory 410 into a potential collision with debris 404. Even if the vehicle 402 avoids the potential collision with the debris 404, the abrupt transitioning instructed by the conventional technology can cause uncomfortable driving behavior. In contrast, the improved technology can help avoid such abrupt transitions that can cause the vehicle 402 to follow such undesirable trajectories. According to the disclosed technology, the primary computing system does not provide the backup computing system with a planned trajectory. For example, continuing with the improved technology timeline 440, at or shortly after t_failure, the backup computing system can generate an emulated trajectory 412 reflecting a current motion of the vehicle 402. At or shortly after t_failure, the backup computing system can adopt the emulated trajectory 412 and provide control signals to motion control components of the vehicle 402 based on the emulated trajectory 412, which may be an extrapolation based on current vehicle motion or based on assumed current trajectory. The control signals allows the vehicle 402 to navigate along the emulated trajectory 412 based on current vehicle motion. In this example, use of the emulated trajectory 412 can help transition control of the vehicle 402 from the primary computing system to the backup computing system in a safe and seamless manner. In some embodiments, at time t_2, the backup computing system can generate a new planned trajectory that successfully reconciles its new planned trajectory with a current motion of the vehicle 402. In such embodiments, the backup computing system may resume controlling the vehicle 402 based on planned trajectories instead of relying on subsequent emulated trajectories. In some embodiments, a duration of use of an emulated trajectory can be a predetermined duration of time or can be a duration of time that is determined dynamically. Once handover from the primary computing system to the backup computing system is complete, the backup computing system can continue planning its own trajectories and controlling the vehicle 402 based on the planned trajectories, as discussed above.

Figure 5:
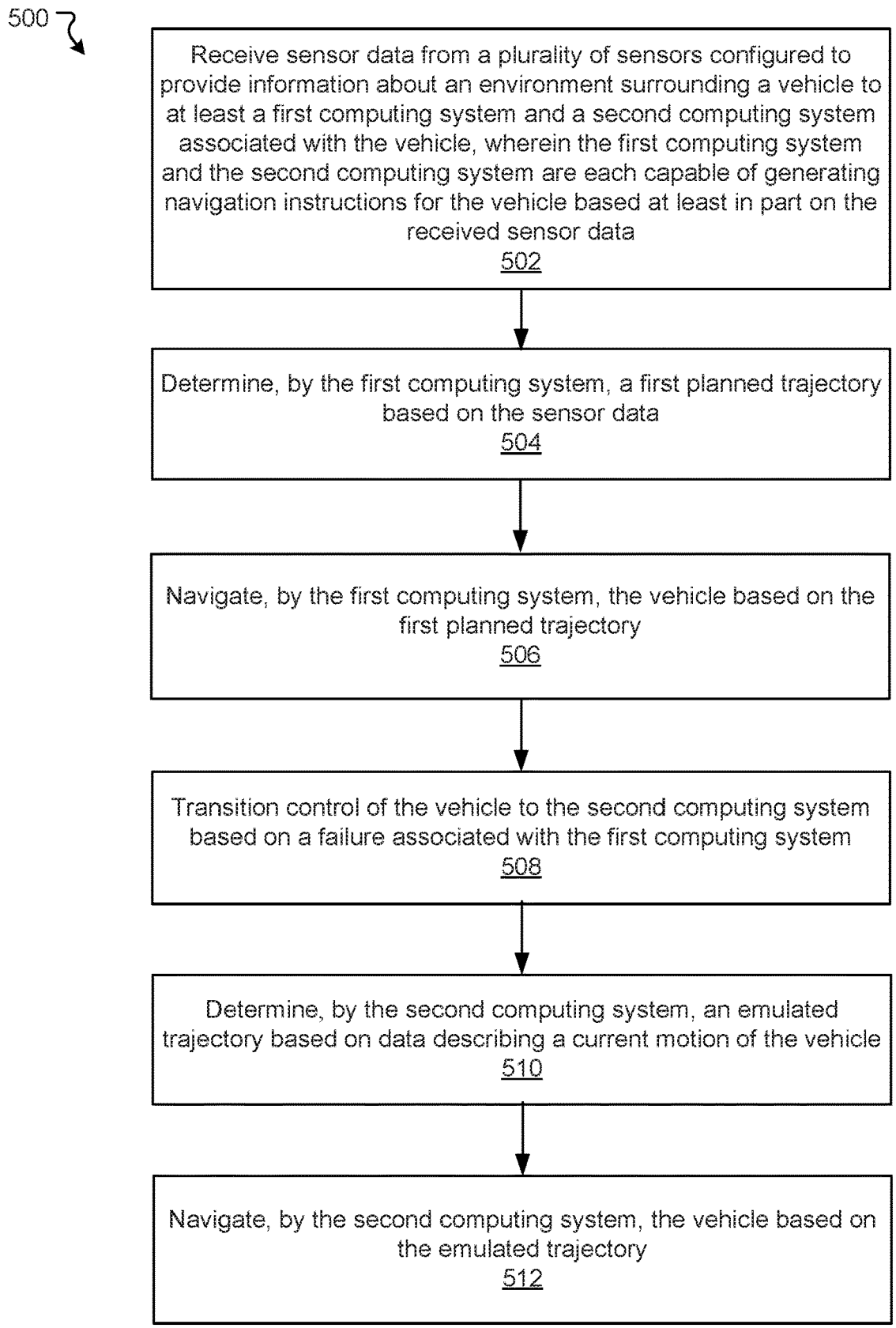
FIG. 5 illustrates an example method, according to an embodiment of the disclosed technology.

FIG. 5 illustrates an example method 500, according to an embodiment of the disclosed technology. At block 502, the example method 500 can receive sensor data from a plurality of sensors configured to provide information about an environment surrounding a vehicle to at least a first computing system and a second computing system associated with the vehicle, wherein the first computing system and the second computing system are each capable of generating navigation instructions for the vehicle based at least in part on the received sensor data. At block 504, the example method 500 can determine, by the first computing system, a first planned trajectory based on the sensor data. At block 506, the example method 500 can navigate, by the first computing system, the vehicle based on the first planned trajectory. At block 508, the example method 500 can transition control of the vehicle to the second computing system based on a failure associated with the first computing system. At block 510, the example method 500 can determine, by the second computing system, an emulated trajectory based on data describing a current motion of the vehicle. At block 512, the example method 500 can navigate, by the second computing system, the vehicle based on the emulated trajectory.

Many variations to the example method are possible. It should be appreciated that there can be additional, fewer, or alternative steps performed in similar or alternative orders, or in parallel, within the scope of the various embodiments discussed herein unless otherwise stated.

Figure 6:
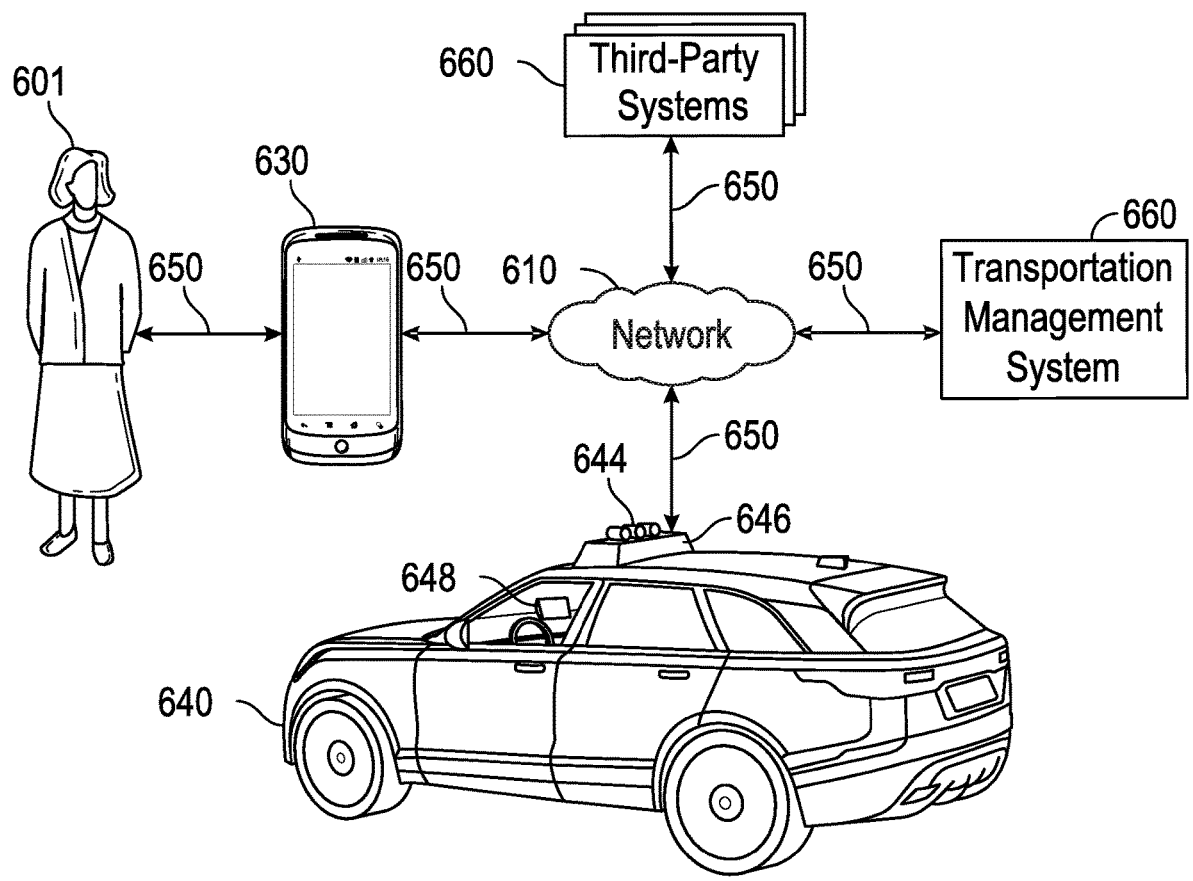
FIG. 6 illustrates an example block diagram of a transportation management environment, according to an embodiment of the disclosed technology.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules of the smart monitoring module 202 may be implemented by one or more computing systems of the transportation management system 660. In some embodiments, some or all modules of the smart monitoring module 202 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
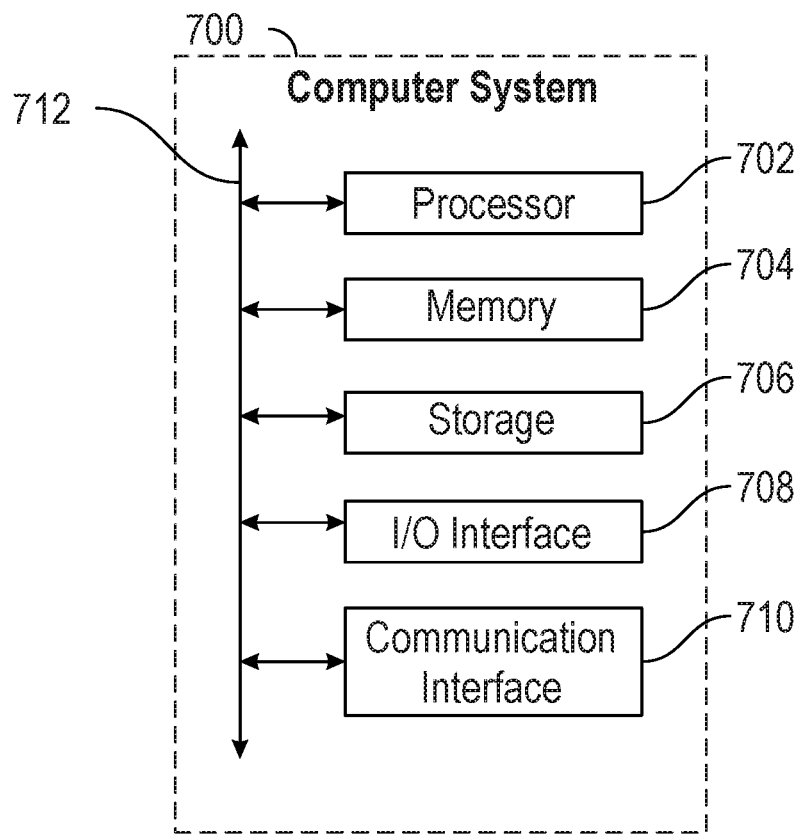
FIG. 7 illustrates an example of a computer system or computing device that can be utilized in various scenarios, according to an embodiment of the disclosed technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
receiving sensor data from a plurality of sensors configured to provide information about an environment surrounding a vehicle to at least a first computing system and a second computing system of the vehicle, wherein the first computing system and the second computing system generate navigation instructions for the vehicle based, at least in part, on the received sensor data;
navigating, by the first computing system, the vehicle based, at least in part, on a first planned trajectory;
transitioning control of the vehicle to the second computing system responsive to a failure associated with the first computing system;
determining, by the second computing system, an emulated trajectory according to data describing a current motion of the vehicle, wherein determining the emulated trajectory includes extrapolating the current motion as indicated by a current state of a vehicle motion control component; and
navigating, by the second computing system, the vehicle based on the emulated trajectory.

2. The computer-implemented method of claim 1, further comprising:
determining, by the second computing system, a second planned trajectory based on the sensor data.

3. The computer-implemented method of claim 1, wherein the emulated trajectory is generated faster than a time required for the second computing system to generate a new planned trajectory from the sensor data.

4. The computer-implemented method of claim 1, wherein the vehicle motion control component includes an actuator that controls one of a steering wheel, a brake, and an accelerator of the vehicle.

5. The computer-implemented method of claim 1, wherein the failure is determined by at least one health monitor associated with the first computing system.

6. The computer-implemented method of claim 5, wherein the failure is detected by the health monitor; and
in response, transitioning control of the vehicle to the second computing system based on the failure, wherein the first computing system is a primary computing system and the second computing system is a backup computing system.

7. The computer-implemented method of claim 1, wherein the first computing system does not provide the second computing system with the first planned trajectory.

8. The computer-implemented method of claim 4, wherein the vehicle motion control component is configured to control at least one of a brake, an accelerator, an engine, or a steering wheel, and wherein the emulated trajectory is determined based on information provided by the vehicle motion control component.

9. The computer-implemented method of claim 8, wherein the extrapolation is a linear extrapolation determined based on parameters associated with the vehicle motion control components including at least one of angle, power, speed, torque, or derivatives of the parameters.

10. The computer-implemented method of claim 9, wherein the linear extrapolation reflects an instantaneous velocity of the vehicle at a time of the transition of control.

11. A system comprising:
at least one processor; and
a memory storing instructions that, when executed by the at least one processor, cause the system to perform:
receiving sensor data from a plurality of sensors configured to provide information about an environment surrounding a vehicle to at least a first computing system and a second computing system of the vehicle, wherein the first computing system and the second computing system generate navigation instructions for the vehicle based, at least in part, on the received sensor data;
navigating, by the first computing system, the vehicle based, at least in part, on a first planned trajectory;
transitioning control of the vehicle to the second computing system responsive to a failure associated with the first computing system;
determining, by the second computing system, an emulated trajectory according to data describing a current motion of the vehicle, wherein determining the emulated trajectory includes extrapolating the current motion as indicated by a current state of a vehicle motion control component; and
navigating, by the second computing system, the vehicle based on the emulated trajectory.

12. The system of claim 11, wherein the emulated trajectory is generated faster than a time required for the second computing system to generate a new planned trajectory from the sensor data.

13. The system of claim 11, wherein the vehicle motion control component includes an actuator that controls one of a steering wheel, a brake, and an accelerator of the vehicle.

14. The system of claim 13, wherein at least one vehicle motion control component is configured to control at least one of a brake, an accelerator, an engine, or a steering wheel, and wherein the emulated trajectory is determined based on information provided by the vehicle motion control component.

15. The system of claim 14, wherein the extrapolation is a linear extrapolation determined based on parameters associated with the vehicle motion control components including at least one of angle, power, speed, torque, or derivatives of the parameters.

16. A non-transitory computer-readable storage medium including instructions that, when executed by at least one processor of a computing system, cause the computing system to perform a method comprising:
receiving sensor data from a plurality of sensors configured to provide information about an environment surrounding a vehicle to at least a first computing system and a second computing system of the vehicle, wherein the first computing system and the second computing system generate navigation instructions for the vehicle based, at least in part, on the received sensor data;

navigating, by the first computing system, the vehicle based, at least in part, on a first planned trajectory;

transitioning control of the vehicle to the second computing system response to a failure associated with the first computing system;

determining, by the second computing system, an emulated trajectory according to data describing a current motion of the vehicle, wherein determining the emulated trajectory includes extrapolating the current motion as indicated by a current state of a vehicle motion control component; and navigating, by the second computing system, the vehicle based on the emulated trajectory.

17. The non-transitory computer-readable storage medium of claim 16, wherein the emulated trajectory is generated faster than a time required for the second computing system to generate a new planned trajectory from the sensor data.

18. The non-transitory computer-readable storage medium of claim 16, wherein the vehicle motion control component includes an actuator that controls one of a steering wheel, a brake, and an accelerator of the vehicle.

19. The non-transitory computer-readable storage medium of claim 18, wherein the vehicle motion control component is configured to control at least one of a brake, an accelerator, an engine, or a steering wheel, and wherein the emulated trajectory is determined based on information provided by the vehicle motion control component.

20. The non-transitory computer-readable storage medium of claim 19, wherein the extrapolation is a linear extrapolation determined based on parameters associated with the vehicle motion control components including at least one of angle, power, speed, torque, or derivatives of the parameters.

* * * * *